United States Patent
O'Malley et al.

(10) Patent No.: US 10,831,466 B2
(45) Date of Patent: Nov. 10, 2020

(54) AUTOMATIC PATCH MANAGEMENT (71) Applicant: International Business Machines Corporation, Armonk, NY (US)

(72) Inventors: John O'Malley, Newcastle (IE); Michael Ryan, Claregalway (IE)

(73) Assignee: International Business Machines Corporation, Armonk, NY (US)

( * ) Notice: Subject to any disclaimer, the term of this patent is extended or adjusted under 35 U.S.C. 154(b) by 663 days.

(21) Appl. No.: 15/472,695

(22) Filed: Mar. 29, 2017

(65) Prior Publication Data
US 2018/0285086 A1 Oct. 4, 2018

(51) Int. Cl.
*G06F 9/445* (2018.01)
*G06F 8/65* (2018.01)
*H04L 12/24* (2006.01)
*H04L 29/08* (2006.01)

(52) U.S. Cl.
CPC ............ *G06F 8/65* (2013.01); *H04L 41/082* (2013.01); *H04L 41/0816* (2013.01); *H04L 67/303* (2013.01); *H04L 67/34* (2013.01); *H04L 41/0853* (2013.01)

(58) Field of Classification Search
CPC ......... G06F 8/65; H04L 67/303; H04L 67/34; H04L 41/082; H04L 41/0816; H04L 41/0853
See application file for complete search history.

(56) References Cited

U.S. PATENT DOCUMENTS

| 5,579,440 | A | 11/1996 | Brown |
| 6,854,009 | B1 * | 2/2005 | Hughes ................. G06F 9/4406 709/219 |
| 7,293,002 | B2 | 11/2007 | Starzyk |
| 7,478,073 | B2 | 1/2009 | Kaplan et al. |
| 7,787,395 | B2 | 8/2010 | Bonsma |
| 8,065,428 | B2 | 11/2011 | Cromer et al. |
| 8,140,651 | B2 | 3/2012 | Pappas et al. |

(Continued)

FOREIGN PATENT DOCUMENTS

FR 2811449 A1 1/2002

OTHER PUBLICATIONS

"Rewriting the rules of patch management: IBM BigFix shifts the patching paradigm", International Business Machines Corporation, White Paper, Jul. 2015, 12 pages.

(Continued)

*Primary Examiner* — Lewis A Bullock, Jr.
*Assistant Examiner* — Tina Huynh
(74) *Attorney, Agent, or Firm* — Yee & Associates, P.C.

(57) ABSTRACT

Managing application changes is provided. Devices within a plurality of devices are grouped to form a set of devices based on configuration data corresponding to the devices. An application change is deployed to a subset of the set of devices in response to determining that the application change is available. Performance data corresponding to the application change is collected from the subset of devices over a predefined time period. The application change is deployed to a remainder of devices in the set of devices in response to the performance data indicating a positive application change to the subset of devices increasing a level of performance of the subset of devices greater than an increased performance threshold level.

19 Claims, 7 Drawing Sheets

(56) References Cited

U.S. PATENT DOCUMENTS

| | | |
|---|---|---|
| 8,180,869 B2 | 5/2012 | Fish |
| 9,015,227 B2 | 4/2015 | Mazzucco et al. |
| 9,229,902 B1 | 1/2016 | Leis et al. |
| 9,298,925 B1 | 3/2016 | Crittall et al. |
| 9,336,268 B1 * | 5/2016 | Moudy .................. G06F 16/244 |
| 2002/0198853 A1 | 12/2002 | Rose |
| 2003/0174048 A1 * | 9/2003 | McCorkle .......... G08B 13/2431 |
| | | 340/10.34 |
| 2004/0054638 A1 | 3/2004 | Agami et al. |
| 2008/0034363 A1 * | 2/2008 | Jones ........................ G06F 8/60 |
| | | 717/174 |
| 2008/0120401 A1 * | 5/2008 | Panabaker ............ H04L 63/104 |
| | | 709/223 |
| 2008/0288584 A1 * | 11/2008 | Colantuono .......... H04L 67/125 |
| | | 709/203 |
| 2009/0198801 A1 * | 8/2009 | Waud ...................... G06F 8/656 |
| | | 709/221 |
| 2012/0110071 A1 * | 5/2012 | Zhou ...................... G06Q 30/02 |
| | | 709/204 |
| 2013/0067469 A1 | 3/2013 | Das et al. |
| 2013/0326493 A1 * | 12/2013 | Poonamalli ............... G06F 8/65 |
| | | 717/168 |
| 2014/0068613 A1 * | 3/2014 | Iriguchi .................. G06F 8/656 |
| | | 718/1 |
| 2014/0337607 A1 * | 11/2014 | Peterson ................ G06F 9/4401 |
| | | 713/1 |
| 2016/0132372 A1 | 5/2016 | Anderson et al. |
| 2016/0216960 A1 * | 7/2016 | Garman .................... G06F 8/60 |
| 2016/0259638 A1 | 9/2016 | El et al. |
| 2018/0067841 A1 * | 3/2018 | Mahimkar .......... G06F 11/3668 |
| 2018/0082389 A1 * | 3/2018 | Guggilla ................ G06Q 50/18 |

OTHER PUBLICATIONS

"Rouge Detection Tool", ZOHO Corporation, copyright 2004-2012, 5 pages. https://www.manageengine.com/products/oputils/help/addressmgmt/wireless_wired_rogue_detection_tool.html.

Kephart et al., "The Vision of Autonomic Computing", Computer, vol. 36, No. 1, Jan. 2003, pp. 41-50.

Sohail, "Automation of Network Management with Multidisciplinary Concepts", International Journal of Computer Technology and Applications, vol. 1, No. 1, Dec. 2010, pp. 71-77.

* cited by examiner

AUTOMATIC PATCH MANAGEMENT

BACKGROUND

1. Field

The disclosure relates generally to patching software applications and more specifically to automatically managing patching of software applications to increase performance of enterprise devices while maintaining patch and security compliance.

2. Description of the Related Art

Currently, it is difficult to maintain performance of devices across an enterprise while maintaining patch and security compliance. A patch is a piece of software designed to update an application or its supporting data to fix or improve the application. This includes fixing security vulnerabilities and improving the usability or performance of the application. Usability is the degree to which the application can be utilized by users to achieve objectives in a context of use. Performance is the amount of work accomplished by the application. Depending on the context, increased performance may include, for example, decreased response time, increased throughput, decreased utilization of device resources, increased availability, increased network bandwidth, decreased data transmission time, and the like.

Large enterprises monitor and manage tens of thousands to millions of devices. These devices may include, for example, employee owned devices, such as smart phones, personal digital assistants, and handheld computers, and enterprise owned devices, such as telephones, laptop computers, desktop computers, server computers, and virtual machines, to illustrate the variety. In addition to the number and variety of these devices, the number and complexity of applications that run on these devices has increased along with the challenge of maintaining security and patching compliance.

Malware attacks exploit security vulnerabilities before software vendors are able to publish patches and their customers can apply them. Enterprises may lose productivity and risk loss of sensitive data, potential litigation, and regulatory fines caused by these malware attacks. To combat these threats, software vendors are issuing more and more patches in an attempt to keep pace with the malware exploitation of security vulnerabilities. However, many enterprises are not equipped to handle this increasing number of software patches in a time and cost effective manner. For example, it may take an IT department weeks or even months to deploy patches throughout their environments. In fact, it may take an enterprise several months to achieve complete patch compliance. By that time, software vendors may have issued additional patches, which means that the enterprise is still at high risk and out of compliance.

Enterprises may need to establish, document, and prove compliance with patch management processes to comply with governmental regulations, service level agreements, and corporate policies. Many governmental regulations, such as, for example, Sarbanes-Oxley, Payment Card Industry Data Security Standard, and Health Insurance Portability and Accountability Act, require that a regular, fully documented patch management process be in place, with proof of continuous patch compliance, in order to pass audits. Unfortunately, many enterprises spend enormous amounts of time and resources on patch management, yet still do not meet patch compliance requirements.

SUMMARY

According to one illustrative embodiment, a computer-implemented method for managing application changes is provided. A computer groups devices within a plurality of devices to form a set of devices based on configuration data corresponding to the devices. The computer deploys an application change to a subset of the set of devices in response to determining that the application change is available. The computer collects performance data corresponding to the application change from the subset of devices over a predefined time period. The computer deploys the application change to a remainder of devices in the set of devices in response to the performance data indicating a positive application change to the subset of devices increasing a level of performance of the subset of devices greater than an increased performance threshold level. According to other illustrative embodiments, a computer system and computer program product for managing application changes are provided.

DETAILED DESCRIPTION

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
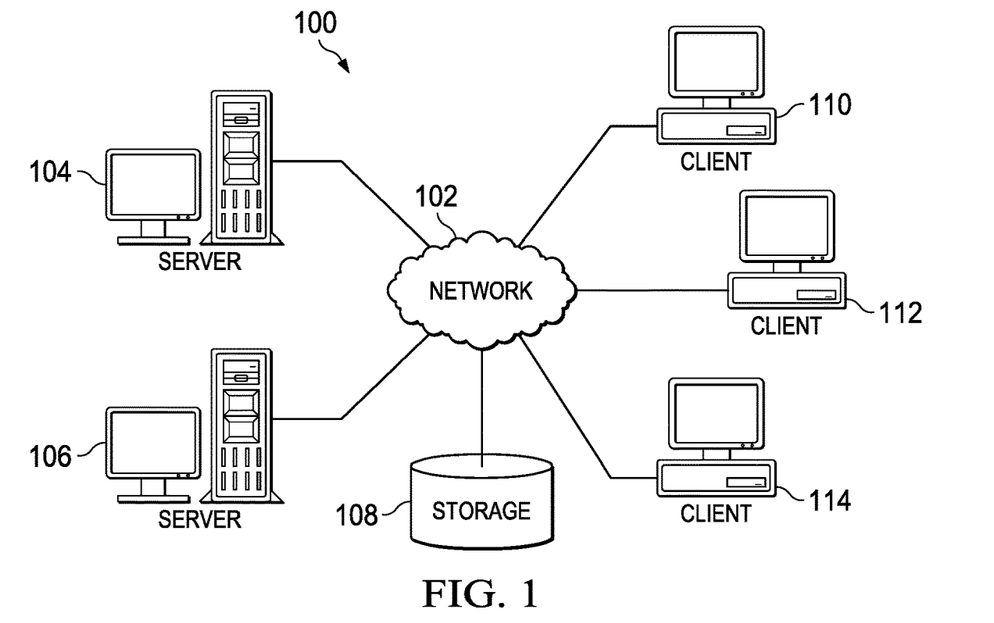
FIG. 1 is a pictorial representation of a network of data processing systems in which illustrative embodiments may be implemented.
Figure 2:
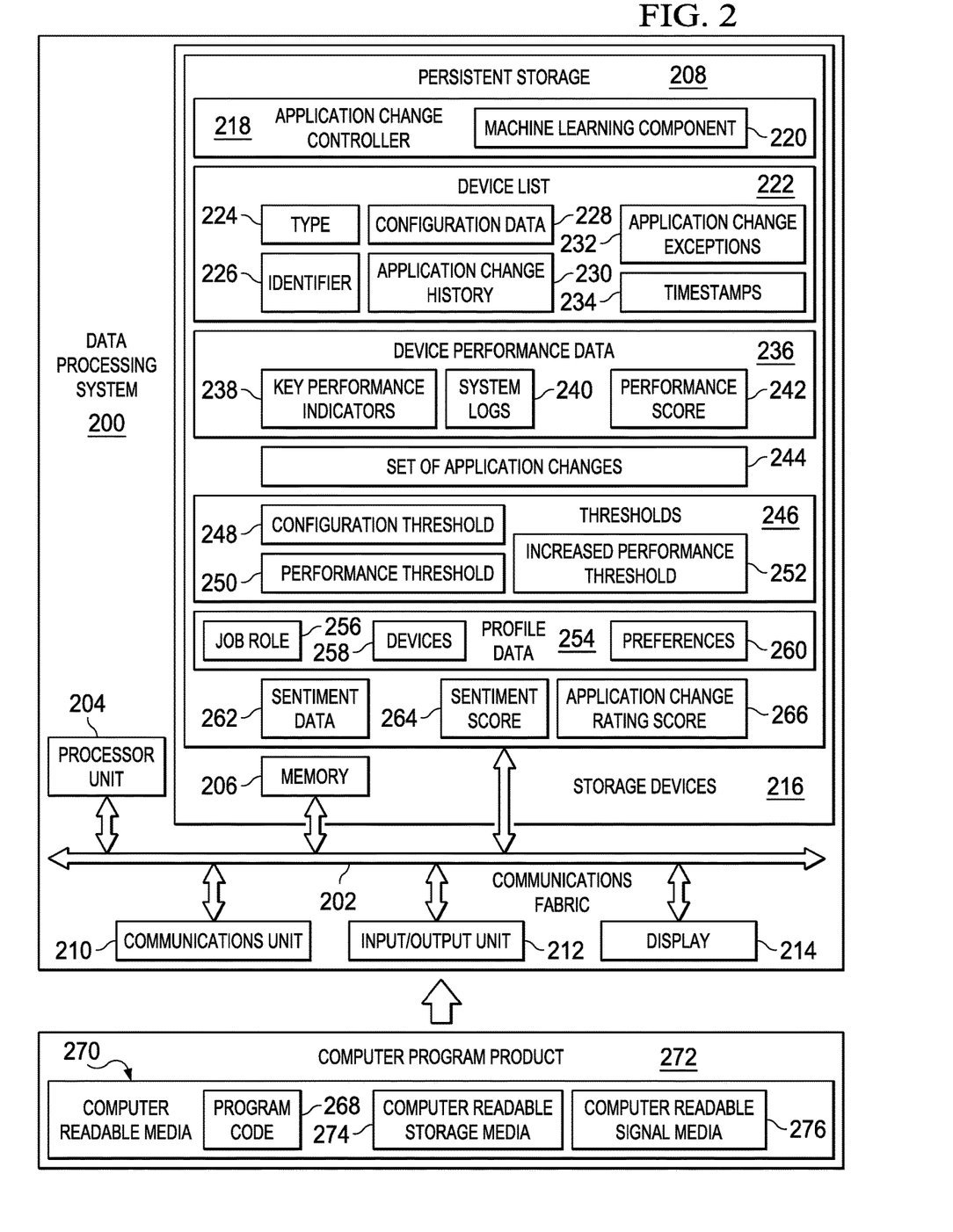
FIG. 2 is a diagram of a data processing system in which illustrative embodiments may be implemented.
Figure 3:
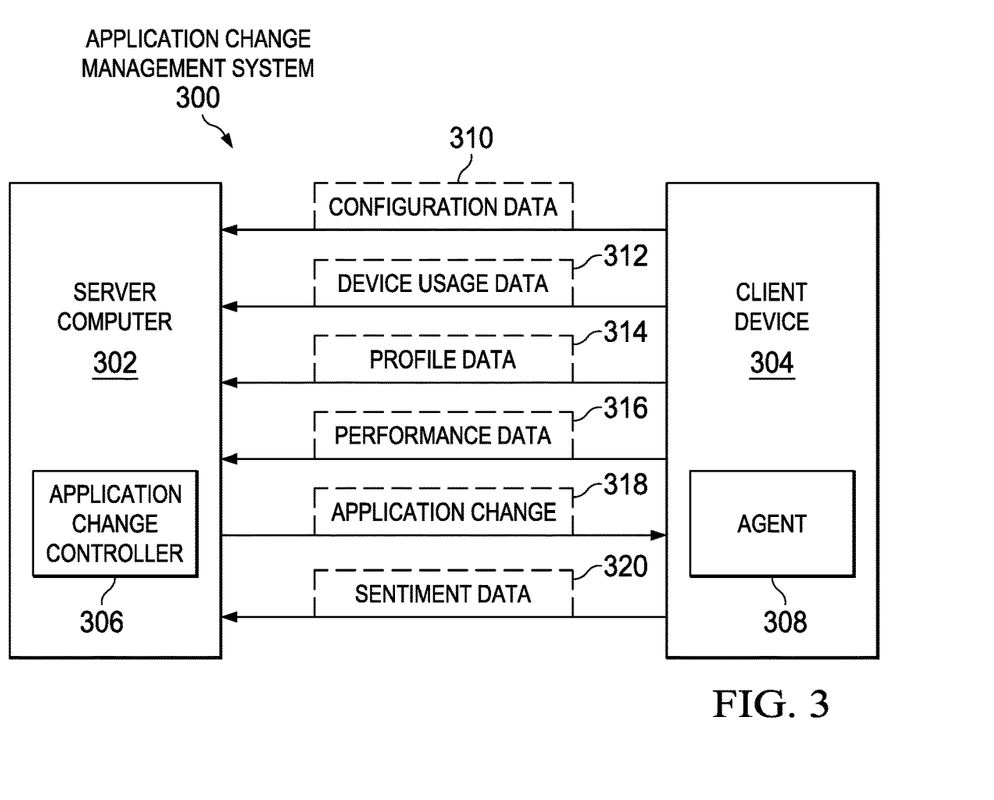
FIG. 3 is a diagram illustrating an example of an application change management system in accordance with an illustrative embodiment.

With reference now to the figures, and in particular, with reference to FIGS. 1-3, diagrams of data processing environments are provided in which illustrative embodiments may be implemented. It should be appreciated that FIGS. 1-3 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, server computers with high-speed connections to network 102. In addition, server 104 and server 106 may provide a set of services, such as, for example, automatic software application patch management services, to a plurality of different types of client devices. Also, it should be noted that server 104 and server 106 may each represent a plurality of different server computers providing a plurality of different software application patch management services.

Client 110, client 112, and client 114 also connect to network 102. Clients 110, 112, and 114 are clients of server 104 and server 106. Further, server 104 and server 106 may provide information, such as, for example, operating system images, software applications, application patches and updates, and other data, to clients 110, 112, and 114.

In this example, clients 110, 112, and 114 are illustrated as desktop or personal computers. However, it should be noted that clients 110, 112, and 114 are meant as examples only. In other words, clients 110, 112, and 114 may include other types of data processing systems, such as, for example, network computers and devices, laptop computers, handheld tablet computers, personal digital assistants, smart phones, cellular telephones, landline telephones, smart watches, smart televisions, gaming devices, kiosks, and the like, with wire or wireless communication links to network 102. Users of clients 110, 112, and 114 may utilize applications loaded on clients 110, 112, and 114 to perform, for example, a plurality of different activities and tasks associated with the users' different job roles within an enterprise or organization.

Storage 108 is a network storage device capable of storing any type of data in a structured format or an unstructured format. In addition, storage 108 may represent a set of one or more network storage devices. Storage 108 may store, for example, names and identifiers for a plurality of different client device users; profiles for each of the plurality of different client device users; names and identifiers for a plurality of different client devices; software and hardware configuration data for each client device; software configuration change histories corresponding to client devices; and the like. Further, storage 108 may store other data, such as authentication or credential data that may include user names, passwords, and biometric data associated with the client device users and system administrators, for example.

In addition, it should be noted that network data processing system 100 may include any number of additional server computers, client devices, and other devices not shown. Program code located in network data processing system 100 may be stored on a computer readable storage medium and downloaded to a computer or data processing system for use. For example, program code may be stored on a computer readable storage medium on server 104 and downloaded to client 110 over network 102 for use on client 110.

In the depicted example, network data processing system 100 may be implemented as a number of different types of communication networks, such as, for example, an internet, an intranet, a local area network (LAN), a wide area network (WAN), or any combination thereof. FIG. 1 is intended as an example, and not as an architectural limitation for the different illustrative embodiments.

With reference now to FIG. 2, a diagram of a data processing system is depicted in accordance with an illustrative embodiment. Data processing system 200 is an example of a computer, such as server 104 in FIG. 1, in which computer readable program code or program instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random access memory, or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores application change controller 218. Application change controller 218 automatically manages software application changes on client devices to increase performance of the client devices while maintaining security compliance. A software application change may include, for example, applying a patch to an application, a program, a script, a segment of software code, or the like, which is located on a client device. A software application change also may include adding and/or removing an application, a program, a script, a segment of software code, or the like from a client device.

Application change controller 218 in this example includes machine learning component 220. Machine learning component 220 is an artificial intelligence component with cognitive functions capable of learning and problem solving. Application change controller 218 utilizes machine learning component 220 to determine which application changes to apply to different client devices based on application change histories, device usage data, device software configuration data, historic device performance data, and the like.

It should be noted that even though application change controller 218 is illustrated as residing in persistent storage 208, in an alternative illustrative embodiment application change controller 218 may be a separate component of data processing system 200. For example, application change controller 218 may be a hardware component coupled to communication fabric 202 or a combination of hardware and software components.

Application change controller 218 utilizes device list 222 to discover information corresponding to a particular client device, such as client 110 in FIG. 1. However, it should be noted that device list 222 may contain information corresponding to a plurality of different client devices. In this example, device list 222 includes type 224, identifier 226, configuration data 228, application change history 230, application change exceptions 232, and timestamps 234.

Type 224 represents a type of device, such as, for example, a laptop computer or smart phone, which corresponds to the particular client device listed in device list 222. Identifier 226 represents a name and/or identification number that uniquely identifies the particular client device. Configuration data 228 represent information regarding a software and hardware configuration of the particular client device. Application change history 230 represents a record of application changes that application change controller 218 previously made to the particular client device. The application changes may include, for example, applying patches to applications, adding applications, and/or removing applications.

Application change exceptions 232 identify application changes that are not to be made on the particular client device by application change controller 218. A user of the particular client device may input application change exceptions. Also, machine learning component 220 may determine application change exceptions based on analyzing data corresponding to the particular client device and/or other client devices.

Each timestamp in timestamps 234 corresponds to a different application change exception in application change exceptions 232. Timestamps 234 identify when particular application change exceptions expire. When a particular application change exception expires (i.e., exceeds its corresponding time threshold), application change controller 218 deletes that particular application time exception from application change exceptions 232.

Device performance data 236 represent information regarding a level of performance corresponding to the particular client device. Application change controller 218 retrieves data performance data 236 from the particular client device using an agent or process that application change controller 218 deployed on the particular client device. In this example, device performance data 236 includes key performance indicators 238, system logs 240, and performance score 242.

Key performance indicators 238 represent measurable values indicating the level of performance of the particular client device. Key performance indicators 238 may include, for example, application speed, bandwidth usage, processor usage, memory usage, disk usage, response time, and the like. System logs 240 are logs of events and other activities that have occurred on the particular client device. Application change controller 218 utilizes key performance indicators 238 and system logs 240 to generate performance score 242 for the particular client device. Performance score 242 may be, for example, a percentage value or other numerical value.

Based on key performance indicators 238, system logs 240, and performance score 242, application change controller 218 generates set of application changes 244. Set of application changes 244 represents a set of zero or more application changes for the particular client device. Zero meaning that application change controller 218 has determined that no application changes currently exist for the particular client device.

Application change controller 218 utilizes thresholds 246 to determine how or when to perform a set of one or more actions. In this example, thresholds 246 includes configuration threshold 248, performance threshold 250, and increased performance threshold 252. Configuration threshold 248 represents a predefined device configuration threshold distance level value. Application change controller 218 utilizes configuration threshold 248 to identify other client devices that are within the predefined device configuration distance of the particular client device. After identifying other client devices within the predefined device configuration distance of the particular client device, application change controller 218 groups those identified client devices with the particular client device to form a set of client devices within a plurality of diverse client devices.

Application change controller 218 utilizes performance threshold 250 to determine when the particular client device may need an application change. For example, if performance score 242 corresponding to the particular client device falls below performance threshold 250, then application change controller 218 may identify possible application changes to apply to the particular client device to increase that particular client device's level of performance. Application change controller 218 utilizes increased performance threshold 252 to determine when to apply a particular application change, which increased performance on the particular client device, to other client device in that same group. For example, if increased performance threshold 252 is 10% and a particular application change on the particular client device increased the level of performance of the particular client device by 20%, then application change controller 218 may apply that particular application change to one or more other client devices within that same group.

Profile data 254 represent information corresponding to a user of the particular client device. In addition to generic data, such as name and identifier of the user, profile data 254 include job role 256, devices 258, and preferences 260. Job role 256 represents a role, such as, a manager or supervisor, corresponding to the user's place of employment. It should be noted that application change controller 218 may automatically determine job role 256 by collecting device usage data from a client device. Also, by collecting and monitoring device usage data, application change controller 218 may detect when a job role changes for a user. For example, a user will add and use and/or remove different applications on the client device as the user's job role changes. The adding and removing of applications on the client device may lead application change controller 218 to identify a different usage pattern corresponding to that client device.

Devices 258 represent a set of one or more devices, such as a desktop computer or personal digital assistant, which the user operates in performance of job role 256. Preferences 260 represent a set of one or more preferences of the user regarding devices 258. For example, the user may include a preference in preferences 260 that identifies an application, such as a text messaging application, which the user does not want application change controller 218 to remove. In addition, preferences 260 may include a user preference for application change controller 218 to make application changes to the user's set of devices only during a specified time period, such as, for example, between 12:00 a.m. and 6:00 a.m.

Sentiment data 262 represent the user's sentiment regarding a particular application change to the particular client device, which corresponds to the user. Sentiment data 262 may be positive sentiment (i.e., the user likes the change), neutral sentiment (i.e., the user is indifferent to the change), or negative sentiment (i.e., the user dislikes the change). Application change controller 218 generates sentiment score 264 based on sentiment data 262. In addition, application change controller 218 generates application change rating score 266 based on performance score 242 and sentiment score 264. Application change rating score 266 represents a numerical value that application change controller 218 calculates to rate the application change for that particular client device.

Communications unit 210, in this example, provides for communication with other computers, data processing systems, and client devices via a network, such as network 102 in FIG. 1. Communications unit 210 may provide communications using both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keyboard, keypad, and/or some other suitable input device. Display 214 provides a mechanism to display information to a user and may include touch screen capabilities to allow the user to make on-screen selections through user interfaces or input data, for example.

Instructions for an operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented program instructions, which may be located in a memory, such as memory 206. These program instructions are referred to as program code, computer usable program code, or computer readable program code that may be read and run by a processor in processor unit 204. The program code, in the different embodiments, may be embodied on different physical computer readable storage devices, such as memory 206 or persistent storage 208.

Program code 268 is located in a functional form on computer readable media 270 that is selectively removable and may be loaded onto or transferred to data processing system 200 for running by processor unit 204. Program code 268 and computer readable media 270 form computer program product 272. In one example, computer readable media 270 may be computer readable storage media 274 or computer readable signal media 276. Computer readable storage media 274 may include, for example, an optical or magnetic disc that is inserted or placed into a drive or other device that is part of persistent storage 208 for transfer onto a storage device, such as a hard drive, that is part of persistent storage 208. Computer readable storage media 274 also may take the form of a persistent storage, such as a hard drive, a thumb drive, or a flash memory that is connected to data processing system 200. In some instances, computer readable storage media 274 may not be removable from data processing system 200.

Alternatively, program code 268 may be transferred to data processing system 200 using computer readable signal media 276. Computer readable signal media 276 may be, for example, a propagated data signal containing program code 268. For example, computer readable signal media 276 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 268 may be downloaded over a network to persistent storage 208 from another device or data processing system through computer readable signal media 276 for use within data processing system 200. For instance, program code stored in a computer readable storage media in a data processing system may be downloaded over a network from the data processing system to data processing system 200. The data processing system providing program code 268 may be a server computer, a client computer, or some other device capable of storing and transmitting program code 268.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 274 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Illustrative embodiments manage software components running on a diverse set of devices to satisfy user requirements and to optimize device performance. Illustrative embodiments may group devices together based on device type, performance data, and user profile data. For example, illustrative embodiments may place the same model laptop computer used by all project managers in the same device group. When a new software component or an update to an existing software component becomes available, illustrative embodiments apply or deploy the software change to a subset of devices in the same group and, over a predefined period of time, collect performance data and user sentiment data corresponding to the software change. If illustrative embodiments determine from the collected data that the software change is a positive device change (i.e., increased device performance above a performance threshold), then illustrative embodiments may apply the same software change to the remainder of devices in that same group of devices. By continuously monitoring software running on a group of devices, illustrative embodiments may determine software exceptions. For example, some users, which correspond to a small group of devices, are running software that is not running on a majority of other devices in that group. Illustrative embodiments may determine that one or more of these software exceptions are rogue or orphan processes and may remove or disable these software exceptions on devices unless a user or device registers a software exception as a required software exception.

Thus, illustrative embodiments may apply software changes on certain devices based on a user's current job role and application usage. In addition, illustrative embodiments may evolve software changes into larger software changes by chaining or combining software changes to produce improved software changes. Further, illustrative embodiments may adapt to changing user habits and needs to apply the best device software configuration for the user's current job role.

Illustrative embodiments utilize software change processes to increase device performance while maintaining patch and security compliance. Illustrative embodiments also utilize processes to analyze user sentiment to determine if a user likes a particular software change. Illustrative embodiments may utilize user sentiment to calculate a rating for a particular software change, which illustrative embodiments may utilize to determine whether to apply that particular software change to other devices in the same group of devices.

Illustrative embodiments utilize a cognitive software change controller. The controller monitors a group of devices and makes software changes to the group of devices based on a set of predetermined key performance indicators that measure the performance of those devices. The controller determines which applications and which software configuration changes provide the greatest performance increase to the group of devices.

Running applications has a processing cost and more so for integrated systems deployed across multiple devices. When the applications are performing a task, the task may delay or block another task from running. A multitude of issues may arise due to the variety and quantity of applications running. Several benefits exist for evaluating performance of software changes. For example, the effect across an enterprise is a multiple of performance degradation and lost opportunity experienced on a single device. A user may derive little or no benefit from some applications that the user installed on a device even though the applications are consuming resources on the device. Also, an application may be installed by default on the device, but not used by the user. A user also may download an application that is used once or rarely and may be more appropriate to replace the application with a cloud-based Software as a Service. Further, a user may inadvertently install an unwanted application without the user being fully aware of the installation. Furthermore, adware or malicious software can use up device resources and compromise security. Moreover, some versions of an application may not perform as well as other versions of the application. Also, another application may meet a user's needs more than an application currently installed on a device. For example, the other application may use less resources or cost less. In addition, some applications consume multiple device resources, such as bandwidth and processing time, when the applications are not required to be running by the user. Illustrative embodiments may reduce resource utilization by applications via software configuration.

The controller calculates performance scores for an application and software configuration combinations running on devices. The controller also may perform sentiment analysis on user feedback corresponding to software changes applied to the devices by the controller to incorporate the users' perceived benefit of the software changes. However, it should be noted that performing sentiment analysis is optional. Further, the controller maintains a list of applications or software configurations that the controller should not change based on user input and enterprise security configurations. In addition, the controller may perform a cost-benefit analysis on applications and software configuration combinations to determine whether a software change is worth making on a device (e.g., increases device performance greater than a performance threshold value) and whether the software change will benefit other devices in the same group.

The controller evaluates the value of a software change by contrasting system logs of devices, key performance indicator values of the devices, and user sentiment data corresponding to the software change. The controller correlates and cross-references this data to identify other devices that may benefit from similar software changes. The controller may decide which subset of devices in a group to apply a software change first (e.g., underperformers). The controller collects performance data from this subset of devices to refine the performance score of the software change and then determine which remaining devices in the group to apply the software change to. In the event the controller has no software changes to apply to a device, the controller may direct an agent on the device to perform a device self-test to determine a software change for the device during low resource usage or quiet time.

The controller can train itself based on evaluating key performance indicator values. The controller also may optionally train itself based on evaluating user sentiment corresponding to software changes. Once the initial training phase is completed, the controller may continue to train itself using performance test results from other devices and refine the performance score for each software change. By applying a software change temporarily to a subset of devices in a group and monitoring the effects of the software change over a predetermined period of time, the controller can determine whether the software change is worth making permanent on the subset of devices and worth applying to the remaining devices in the group. The agent on devices collects data about the devices' resource usage. The controller retrieves the agent-collected data to identify which devices are performing better than others and which devices could increase performance.

The controller updates a device that is underperforming in a group in an attempt to align that device with other devices in that same group that have higher performance levels. If the update to the device increases the performance, then the controller calculates the device's performance score using key performance indicators and other criteria. The controller cross-references all the data to find which applications work the best and which applications are resource hungry. By cross-referencing the data, the controller can identify when an application, itself, may be a problem rather than the application just not functioning correctly on a particular device.

If a software change does not show any particular improvement or reduction in device performance, then the controller may perform further analysis to determine why the software change was recommended as a possible solution in the first place. Another corrective action may be given and tested until one is found to improve performance. Knowing that certain devices are not affected by a particular software change is important because the controller can identify those devices as a type where that particular software change will have no effect on those devices. As a result, the controller decreases the application change rating score for those devices.

The controller groups devices based on system information and application usage. Some parameters for grouping may more important than others and should increase the entropy as needed. For example, a device running a Windows-based operating system should not be getting applications that require a Linux-based operating system. A decision tree may be beneficial in this situation. For these and other grouping parameters, a system administrator may assign weights to these parameters in order to evaluate these parameters. This will allow the controller to calculate a distance between device configurations to determine how different devices actually are.

The controller utilizes thresholds in various contexts, such as, for example, in grouping devices to determine how close devices need to be in configuration in order to receive a software change. After a software change, the controller monitors key performance indicator values and if the key performance indicator values exceed a predetermined performance threshold level, then the controller calculates an application change rating score for that software change based on the increase in device performance. In addition, the controller automatically modifies or adjusts the thresholds over time in order to explore alternative software changes.

Timestamps of system events tie actual inputs to the system events being run. The timestamps with system logs can provide the controller with an indication as to what events the user is making happen on a device and what events are happening without user interaction. For example, did the user start an application at a certain time or did the system start the application. This system information is important because when the controller starts cross-referencing data, the controller is able to identify which hardware/software combination works best with certain applications. This type of information only needs to be sent once per device to the controller until a change is applied to a device. The controller uses the timestamps to make sure that a device has been running normally over a time period. This allows the controller to relatively measure performance across devices.

A device may have two states: an evaluating state; and a listening state. Once a device connects to the network, the agent on the device will send its status to and receive updates from the controller and the device goes into a listening state. The device sends a list of applications not to be changed by the controller. When a change comes from the controller, the controller may notify the user via a pop-up screen to verify that the user wants the change. In addition, the list may include timestamps associated with application entries. Until a timestamp corresponding to an application entry exceeds a time threshold, the controller is not allowed to remove that application entry.

A software change is a set of one or more steps that the controller performs on a device in order to update the device. For example, a software change may comprise steps to uniquely identify the software change and relate a rating to certain software configurations in order to determine how effective the software change is for a specific configuration. Software changes also may comprise other software changes so that a chain of changes may be what makes the greatest gain in performance for certain devices.

Initially, a user may train the controller by letting the controller know what applications the user wants on a device. For example, the user may want a text editor, internet browser, and an email client on the device. This is so the controller does not remove these applications from the device. The applications on the device that the user wants to keep are maintained in the list. A permanent entry in the list does not have a time associated with it and when the controller cleans the list, the controller will not delete a permanent entry. A temporary entry in the list does have a time associated with it and when the controller cleans the list, the controller will delete a temporary entry when the time has expired.

Other criteria may come from applications that consume a lot of device resources without being directly called by the user. The controller will check these applications to determine whether these applications are wanted by the user. The controller may check these applications by removing them from a subset of devices in the same group and monitoring the subset of devices for usage.

If the controller determines from data retrieved from devices corresponding to a software change, which was applied to the devices by the controller, had a negative software change impact on the devices, then the controller assumes that the last applied software change has done something wrong to the devices. If the controller determines that all devices receiving the software change were negatively impacted (i.e., decreased device performance), then the controller knows that the software change is a bad change for those devices and records that information. If the controller determines that only a portion of the devices receiving the software change were negatively impacted, then the controller looks deeper into the data retrieved from those devices to identify a pattern of why only those devices had a negative impact corresponding to that software change.

With reference now to FIG. 3, a diagram illustrating an example of an application change management system is depicted in accordance with an illustrative embodiment. Application change management system 300 is a system of software and hardware components for automatically managing application changes, such as patches, to increase performance of client devices while maintaining security compliance. Application change management system 300 may be implemented in a network of data processing systems, such as network data processing system 100 in FIG. 1.

In this example, application change management system 300 includes server computer 302 and client device 304. However, it should be noted that application change management system 300 is only meant as an example and not as a limitation on illustrative embodiments. In other words, application change management system 300 may include any number of server computers, client devices, and other devices not shown. For example, application change management system 300 may include a network relay device between server computer 302 and client device 304. The network relay device may include a portion or all of the functionality of server computer 302. The network relay device may provide redundancy during network congestion or server computer 302 failure, for example.

Server computer 302 may be, for example, server 104 in FIG. 1 or data processing system 200 in FIG. 2. In this example, server computer 302 includes application change controller 306, such as application change controller 218 in FIG. 2. Client device 304 may be, for example, client 110 in FIG. 1. In this example, client device 304 includes agent 308. Agent 308 is a process of application change controller 306. Server computer 302 deploys agent 308 on client device 304. In other words, server computer 302 deploys agent 308 on each client device.

Application change controller 306 utilizes agent 308 to collect and retrieve data, such as configuration data 310, device usage data 312, profile data 314, and performance data 316, from client device 304. Configuration data 310 may be, for example, configuration data 228 in FIG. 2 and represents information regarding a configuration of client device 304. Device usage data 312 represents information regarding the usage of client device 304 by a user. Basically, device usage data 312 is how the user is utilizing client device 304. In addition, device usage data 312 may include what applications the user is running on client device 304 to perform job-related tasks. For example, the user may utilize client device 304 to perform application development tasks during a work day, but other users utilizing similar devices may be performing totally different job-related tasks. Because the different users are performing different job-related tasks on similar devices, the different users are probably running different applications on their respective devices in order to complete their tasks.

Profile data 314 may be, for example, profile data 254 in FIG. 2 and represents information regarding a user of client device 304. Performance data 316 may be, for example, device performance data 236 in FIG. 2 and represents a performance level corresponding to client device 304 based on key performance indicator values, system logs, and device self-test results.

Application change controller 306 utilizes retrieved configuration data 310, device usage data 312, profile data 314, and performance data 316 to determine application change 318. Application change controller 306 applies application change 318 to client device 304 to increase the performance level of client device 304. Subsequently, application change controller 306 receives sentiment data 320, such as sentiment data 262 in FIG. 2, from a user of client device 304. Application change controller 306 utilizes sentiment data 320 in calculating an application change rating score, such as application change rating score 266 in FIG. 2, for application change 316, which application change controller 306 applied to client device 304.

Figure 4:
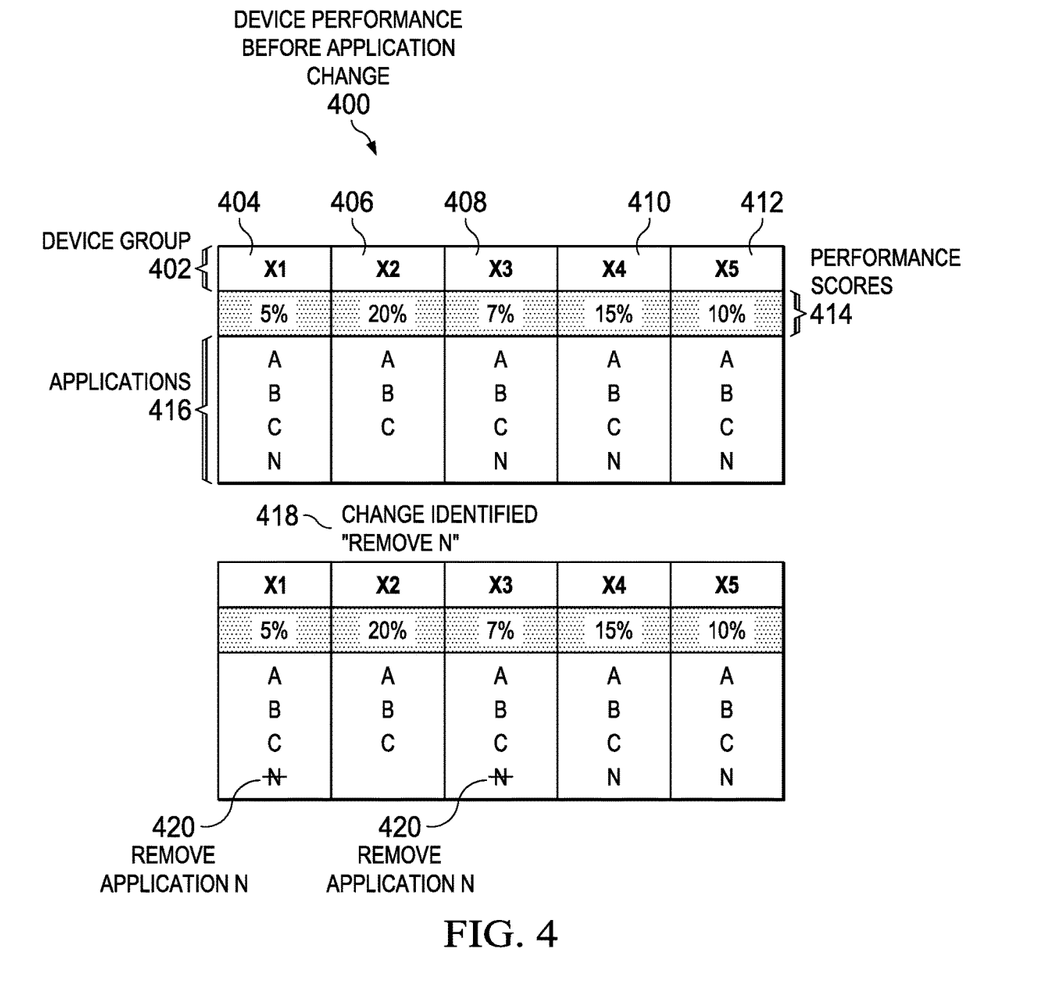
FIG. 4 is a diagram illustrating device performance before application change in accordance with an illustrative embodiment.

With reference now to FIG. 4, a diagram illustrating device performance before application change is depicted in accordance with an illustrative embodiment. Device performance before application change 400 illustrates a level of performance for each device in device group 402. Device group 402 represents a set of devices that are within a configuration threshold distance of each other. The configuration threshold distance may be, for example, configuration threshold 248 in FIG. 2.

In this example, device group 402 includes device X1 404, device X2 406, device X3 408, device X4 410, and device X5 412. Performance score 414 for device X1 404, device X2 406, device X3 408, device X4 410, and device X5 412 is 5%, 20%, 7%, 15%, and 10%, respectively. Applications 416 represent the applications located on each respective device in device group 402.

In this example, device X1 404 includes applications A, B, C, and N; device X2 406 includes applications A, B, and C; device X3 408 includes A, B, C, and N; device X4 410 includes A, B, C, and N; and device X5 412 includes A, B, C, and N. At 418, an application change controller, such as, for example, application change controller 306 in FIG. 3, identifies an application change of remove application N for device X1 404 and device X3 408 because the application change controller determined that device X1 404 and device X3 408 are underperforming based on a performance threshold. For example, device X1 404 and device X3 408 are performing below a performance threshold of 10%. At 420, the application change controller removes application N from device X1 404 and device X3 408.

Figure 5:
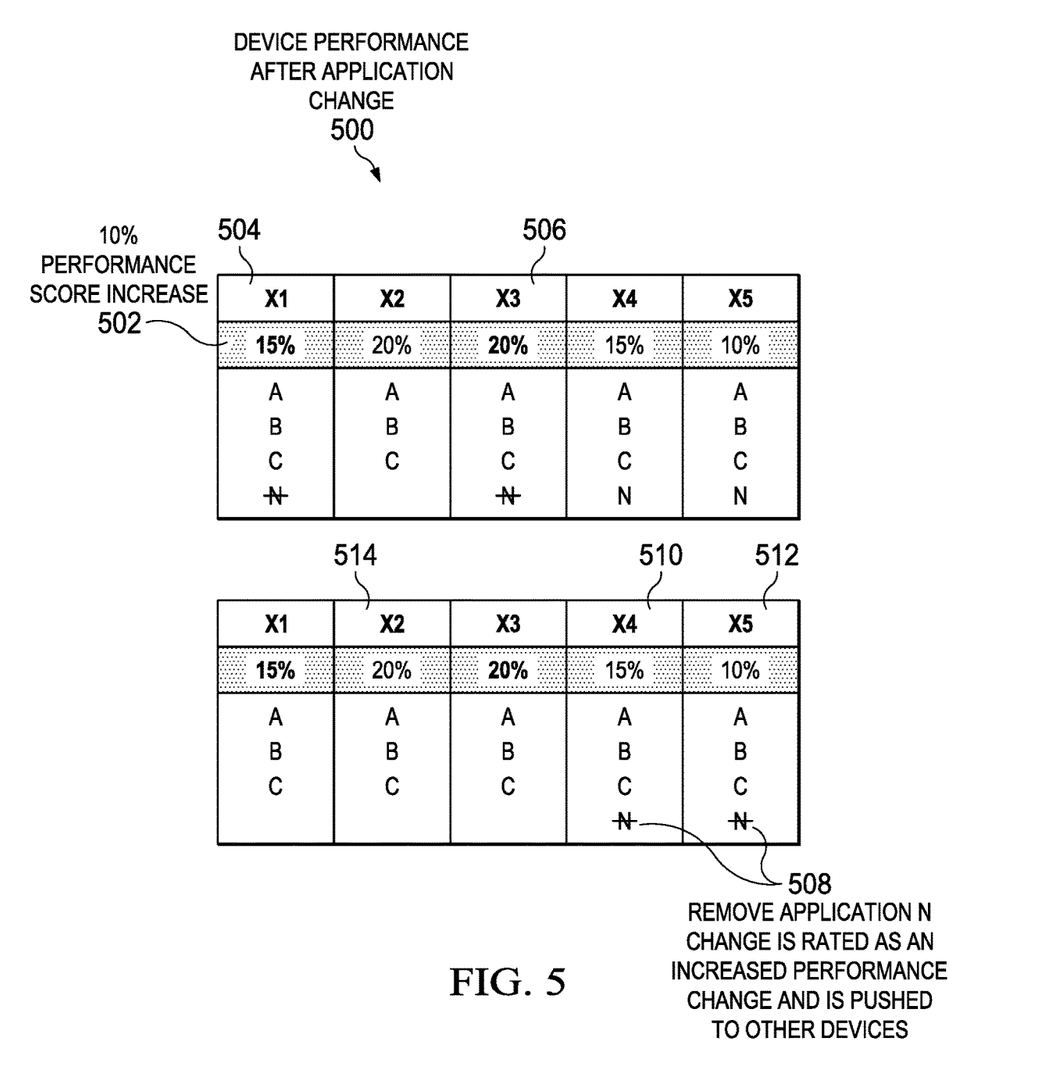
FIG. 5 is a diagram illustrating device performance after application change in accordance with an illustrative embodiment.

With reference now to FIG. 5, a diagram illustrating device performance after application change is depicted in accordance with an illustrative embodiment. Device performance after application change 500 illustrates a 10% performance score increase 502 for device X1 504 and device X3 506. Device X1 504 and device X3 506 are the same as device X1 404 and device X3 408 in FIG. 4. At 508, an application change controller, such as, for example, application change controller 306 in FIG. 3, rates the application change of removing application N from device X1 504 and device X3 506 as an increased performance change, which is greater than or equal to an increased performance change threshold level (e.g., 10%), and applies that same application change to device X4 510 and device X5 512. The application change controller does not apply that same change to device X2 514 because device X2 514 did not previously include application N in its software configuration.

Figure 6:
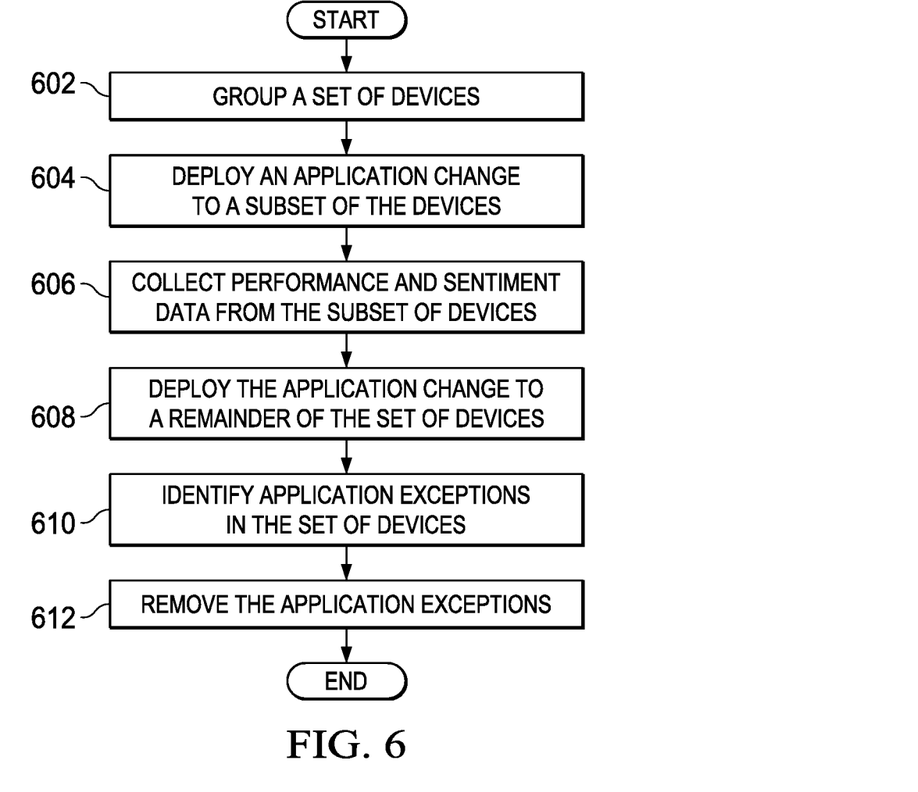
FIG. 6 is a flowchart illustrating a process for deploying an application change in accordance with an illustrative embodiment.

With reference now to FIG. 6, a flowchart illustrating a process for deploying an application change is shown in accordance with an illustrative embodiment. The process shown in FIG. 6 may be implemented in a computer, such as, for example, server 104 in FIG. 1, data processing system 200 in FIG. 2, or server computer 303 in FIG. 3.

The process begins when the computer groups a set of two or more client devices within a plurality of client devices based on configuration data, device usage data, and user profile data corresponding to the set of client devices (step 602). In addition, the computer deploys an application change to a subset of the set of client devices in response to determining that the application change is available (step 604). Further, the computer collects performance data and user sentiment data corresponding to the application change from the subset of client devices over a predefined time period (step 606).

Subsequently, the computer deploys the application change to a remainder of client devices in the set of client devices in response to the performance data and the user sentiment data indicating a positive application change to the subset of client devices increasing a level of performance of the subset of client devices greater than an increased performance threshold level (step 608). Furthermore, the computer identifies application exceptions not running on a majority of devices in the set of client devices based on monitoring applications running on the set of client devices (step 610). Moreover, the computer removes the application exceptions running on one or more of the set of client devices (step 612). Thereafter, the process terminates.

Figure 7A:
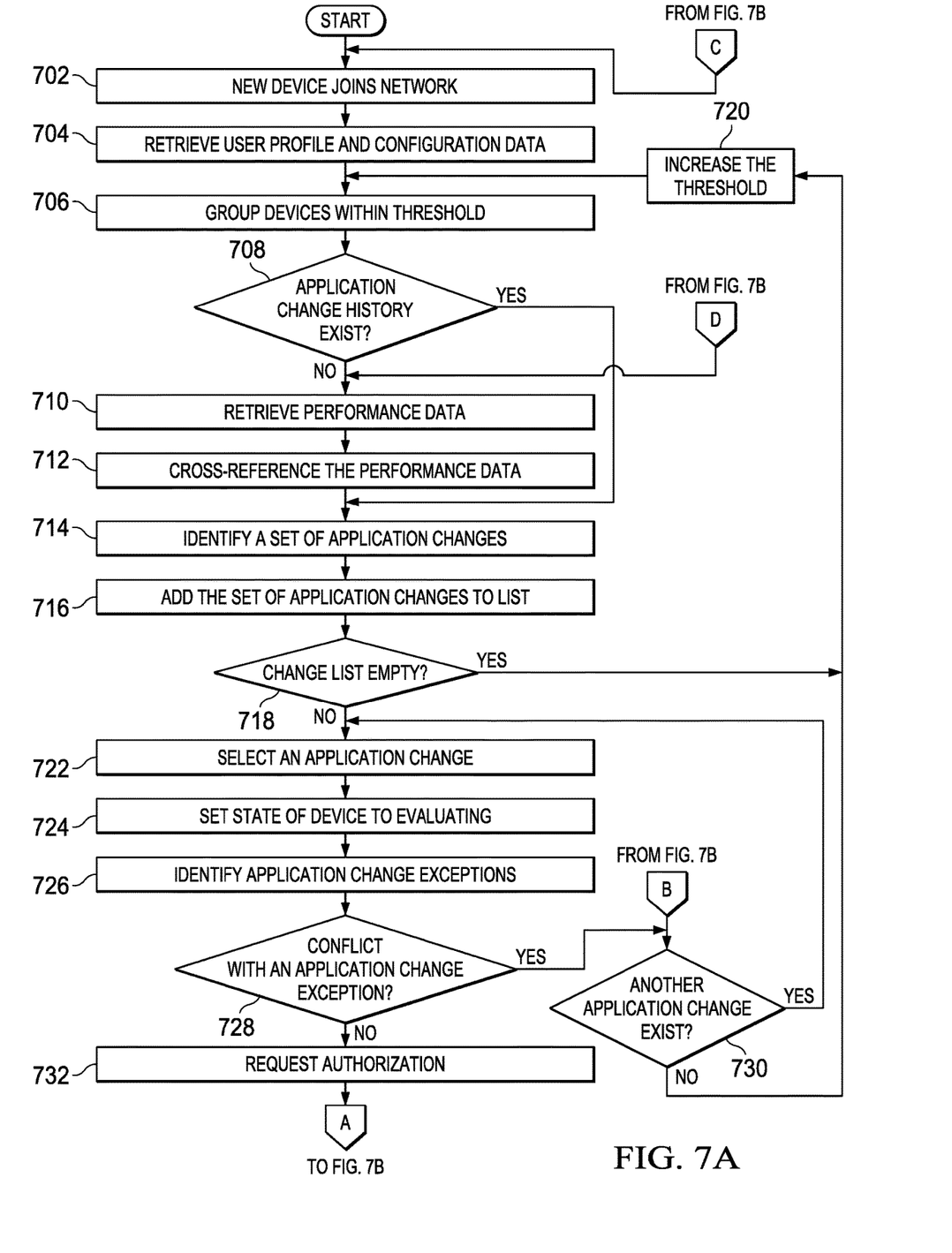
FIGS. 7A-7B are a flowchart illustrating a process for managing application changes in accordance with an illustrative embodiment.
Figure 7B:
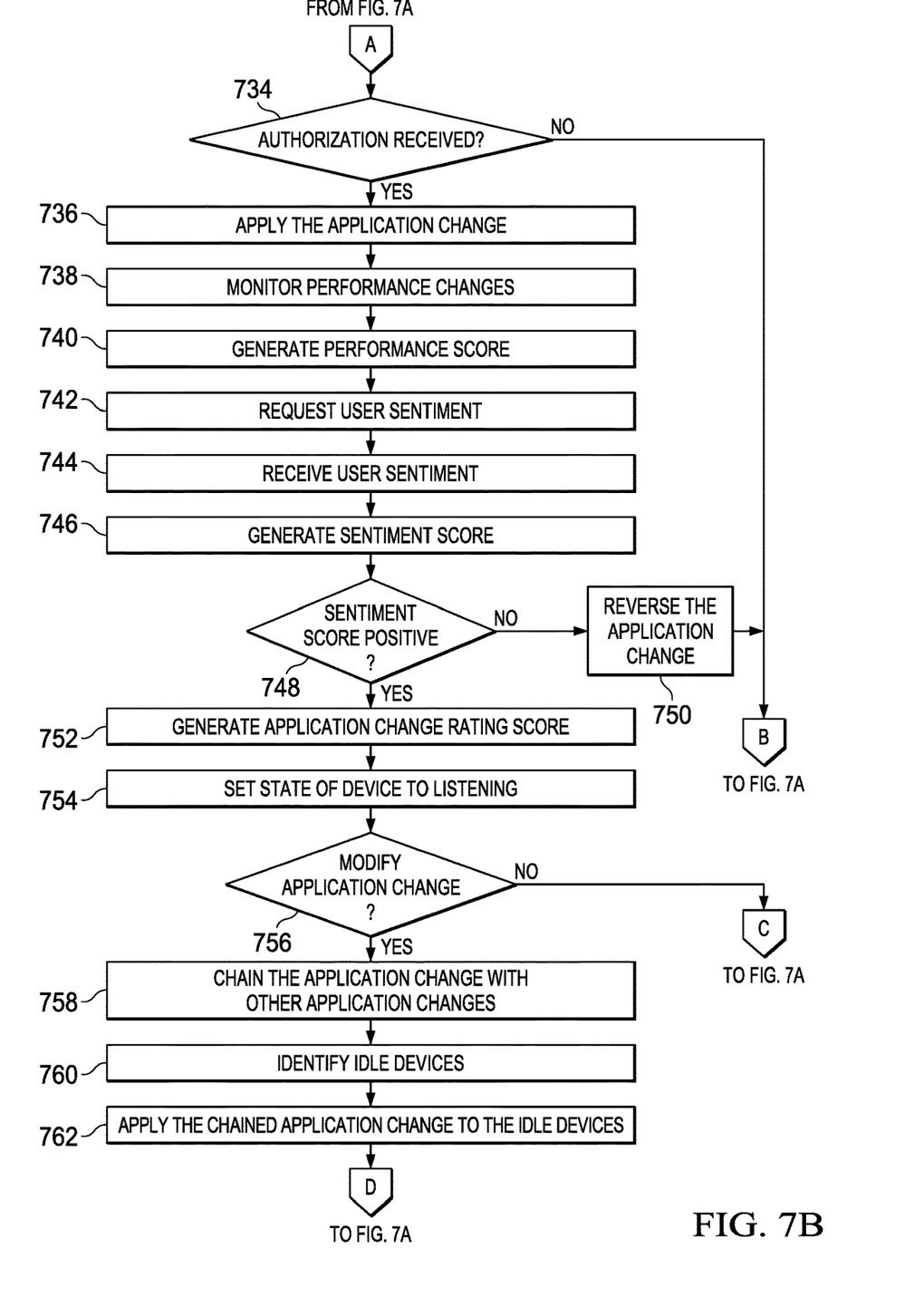

With reference now to FIGS. 7A-7B, a flowchart illustrating a process for managing application changes is shown in accordance with an illustrative embodiment. The process shown in FIGS. 7A-7B may be implemented in a computer, such as, for example, server 104 in FIG. 1, data processing system 200 in FIG. 2, or server computer 303 in FIG. 3.

The process begins when the computer receives an indication that a new client device joined a network corresponding to the computer (step 702). The computer retrieves user profile data and configuration data corresponding to the new client device via the network (step 704). In addition, the computer places the new client device in a group of client devices that are within a predefined configuration threshold distance level of the new client device based on the user profile data and the configuration data corresponding to the new client device (step 706).

Further, the computer makes a determination as to whether an application change history exists for the group of client devices (step 708). The application change history for the group is record of application changes previously made to each of the client devices included in the group. If the computer determines that an application change history does exist for the group of client devices, yes output of step 708, then the process proceeds to step 714. If the computer determines that an application change history does not exist for the group of client devices, no output of step 708, then the computer retrieves performance data from each device in the group of client devices (step 710).

The computer cross-references the performance data from each device in the group of client devices to identify devices with an increased level of performance and to identify application changes corresponding to the increased level of performance (step 712). Afterward, the computer identifies a set of zero or more application changes corresponding to the increased level of performance in the identified devices that can be applied to the new client device (step 714). The computer adds the set of zero of more application changes to a change list (step 716).

Subsequently, the computer makes a determination as to whether the change list is empty (step 718). If the computer determines that the change list is empty, yes output of step 718, then the computer increases the predefined configuration threshold distance level to increase a number of devices to be included in the group of client devices (step 720). Thereafter, the process returns to step 706 where the computer groups client devices. If the computer determines that the change list is not empty, no output of step 718, then the computer selects an application change in the change list (step 722).

The computer sets a state of the new client device to an evaluating state from a listening state (step 724). In addition, the computer retrieves a device list corresponding to the new client device that identifies application change exceptions via the network (step 726). Subsequently, the computer makes a determination as to whether the selected application change conflicts with an application change exception identified in the device list (step 728).

If the computer determines that the selected application change does conflict with an application change exception identified in the device list, yes output of step 728, then the computer makes a determination as to whether another application change exists in the change list (step 730). If the computer determines that another application change does not exist in the change list, no output of step 730, then the process returns to step 720 where the computer increases the predefined configuration threshold distance level. If the computer determines that another application change does exist in the change list, yes output of step 730, then the process returns to step 722 where the computer selects another application change.

Returning again to step 728, if the computer determines that the selected application change does not conflict with an application change exception identified in the device list, no output of step 728, then the computer requests authorization to apply the application change to the new client device via the network (step 732). However, it should be noted that step 732 is an optional step. In other words, the computer may apply the application change without authorization from the new client device (i.e., proceed directly from no output of step 728 to step 736).

If the computer performs optional step 732, then the computer makes a determination as to whether authorization to apply the application change to the new client device was received (step 734). If the computer determines that authorization was not received, no output of step 734, then the process returns to step 730 where the computer determines whether another application change exists in the change list. If the computer determines that authorization was received, yes output of step 734, then the computer applies the application change to the new client device (step 736).

The computer monitors performance level changes in the new client device via the network over a predetermined period of time after applying the application change (step 738). Further, the computer generates a performance score corresponding to the performance level changes in the new client device over the predetermined period of time (step 740). Furthermore, the computer requests user sentiment data from the new client device regarding the application change to the new client device via the network (step 742).

The computer receives the user sentiment data from the new client device regarding the application change to the new client device via the network (step 744). Moreover, the computer generates a sentiment score corresponding to the user sentiment data received from the new client device (step 746). Afterward, the computer makes a determination as to whether the sentiment score is a positive sentiment score (step 748).

If the computer determines that the sentiment score is a negative sentiment score, no output of step 748, then the computer reverses the application change on the new client device (step 750). Thereafter, the process returns to step 730 where the computer determines whether another application change exists in the change list. If the computer determines that the sentiment score is a positive sentiment score, yes output of step 748, then the computer generates an application change rating score based on the performance score and the sentiment score (step 752).

In addition, the computer sets the state of the new client device to the listening state from the evaluating state (step 754). Furthermore, the computer makes a determination as to whether the application change can be modified with one or more other application changes to increase device performance (step 756). If the computer determines that the application change cannot be modified with one or more other application changes, no output of step 756, then the process returns to step 702 where the computer waits for another new client device to join the network. If the computer determines that the application change can be modified with one or more other application changes, yes output of step 756, then the computer chains the application change with the one or more other application changes to form a chained application change (step 758).

Afterward, the computer identifies idle client devices of similar configuration within the predefined configuration threshold distance level that will possibly benefit from applying the chained application change (step 760). The computer applies the chained application change to the idle client devices of similar configuration within the predefined configuration threshold distance level (step 762). Thereafter, the process returns to step 710 where the computer retrieves performance data from the client devices that had the chained application change applied.

Thus, illustrative embodiments of the present invention provide a computer-implemented method, computer system, and computer program product for automatically managing patching of software applications to increase performance of enterprise devices while maintaining patch and security compliance. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method managing application changes, the computer-implemented method comprising:

grouping, by a computer, devices within a plurality of devices to form a set of devices based on configuration data corresponding to the devices, device usage data corresponding to the devices and user profile data corresponding to the devices;

adding, by the computer, a set of application changes to a change list;

deploying, by the computer, an application change to a subset of the set of devices in response to determining that the application change is available;

determining, by the computer, whether the change list is empty;

responsive to the computer determining that the change list is empty, increasing, by the computer, a predefined configuration threshold distance level to increase a number of devices included in a set of devices;

collecting, by the computer, performance data corresponding to the application change from the subset of devices over a predefined time period; and deploying, by the computer, the application change to a remainder of devices in the set of devices in response to the performance data indicating a positive application change to the subset of devices increasing a level of performance of the subset of devices greater than an increased performance threshold level.

2. The computer-implemented method of claim 1 further comprising:

identifying, by the computer, application exceptions not running on a majority of devices in the set of devices based on monitoring applications running on the set of devices; and removing, by the computer, the application exceptions running on one or more of the set of devices.

3. The computer-implemented method of claim 1 further comprising:

receiving, by the computer, an indication that a new device joined a network corresponding to the computer; and retrieving, by the computer, configuration data corresponding to the new device via the network.

4. The computer-implemented method of claim 3 further comprising:

placing, by the computer, the new device in the set of devices that are within a predefined configuration threshold distance level of the new device based on the configuration data corresponding to the new device;

determining, by the computer, whether an application change history exists for the set of devices; and responsive to the computer determining that the application change history does not exist for the set of devices, retrieving, by the computer, the performance data from the set of devices.

5. The computer-implemented method of claim 4 further comprising:

cross-referencing, by the computer, the performance data from the set of devices to identify devices with an increased level of performance and to identify application changes corresponding to the increased level of performance; and identifying, by the computer, a set of application changes corresponding to the increased level of performance in the identified devices that can be applied to the new device.

6. The computer-implemented method of claim 1 further comprising:

responsive to the computer determining that the change list is not empty, selecting, by the computer, an application change is the change list;

setting, by the computer, a state of the new device to an evaluating state from a listening state; and retrieving, by the computer, a device list corresponding to the new device that identifies application change exceptions.

7. The computer-implemented method of claim 6 further comprising:

determining, by the computer, whether the selected application change conflicts with an application change exception identified in the device list;

responsive to the computer determining that the selected application change does not conflict with an application change exception identified in the device list, requesting, by the computer, authorization to apply the application change to the new device;

determining, by the computer, whether the authorization was received; and responsive to the computer determining that the authorization was received, applying, by the computer, the application change to the new device.

8. The computer-implemented method of claim 7 further comprising:

monitoring, by the computer, performance level changes in the new device over a predetermined period of time after applying the application change; and generating, by the computer, a performance score corresponding to the performance level changes in the new device over the predetermined period of time.

9. The computer-implemented method of claim 8 further comprising:

requesting, by the computer, user sentiment data from the new device regarding the application change to the new device;

receiving, by the computer, the user sentiment data from the new device regarding the application change; and generating, by the computer, a sentiment score corresponding to the user sentiment data received from the new device regarding the application change.

10. The computer-implemented method of claim 9 further comprising:

determining, by the computer, whether the sentiment score corresponding to the user sentiment data received from the new device regarding the application change is a positive sentiment score; and responsive to the computer determining that the sentiment score is a negative sentiment score, reversing, by the computer, the application change on the new device.

11. The computer-implemented method of claim 10 further comprising:

responsive to the computer determining that the sentiment score is a positive sentiment score, generating, by the computer, an application change rating score based on the performance score and the sentiment score, wherein the application change rating score represents a rating for the application change on the new device; and setting, by the computer, the state of the new device to the listening state from the evaluating state.

12. The computer-implemented method of claim 11 further comprising:

determining, by the computer, whether the application change can be modified with one or more other application changes to increase device performance; and responsive to the computer determining that the application change can be modified with one or more other application changes, chaining, by the computer, the application change with the one or more other application changes to form a chained application change.

13. The computer-implemented method of claim 12 further comprising:

identifying, by the computer, idle devices of similar configuration within the predefined configuration threshold distance level that will benefit from applying the chained application change; and applying, by the computer, the chained application change to the idle devices of similar configuration within the predefined configuration threshold distance level.

14. The computer-implemented method of claim 1, wherein the user profile data corresponding to the set of devices comprises a job role for a user of a given device of the plurality of devices, and further comprising:

detecting when the job role changes for the user of the given device based on device usage data of the given device.

15. A computer system for managing application changes, the computer-implemented method comprising:

a bus system;

a storage device connected to the bus system, wherein the storage device stores program instructions; and a processor connected to the bus system, wherein the processor executes the program instructions to:

group devices within a plurality of devices to form a set of devices based on configuration data corresponding to the devices, device usage data corresponding to the devices and user profile data corresponding to the devices;

add a set of application changes to a change list;

deploy an application change to a subset of the set of devices in response to determining that the application change is available;

determine whether the change list is empty;

responsive to the computer determining that the change list is empty, increase a predefined configuration threshold distance level to increase a number of devices included in a the set of devices;

collect performance data corresponding to the application change from the subset of devices over a predefined time period; and deploy the application change to a remainder of devices in the set of devices in response to the performance data indicating a positive application change to the subset of devices increasing a level of performance of the subset of devices greater than an increased performance threshold level.

16. A computer program product for managing application changes, the computer program product comprising a computer readable storage medium having program instructions embodied therewith, the program instructions executable by a computer to cause the computer to perform a method comprising:

grouping, by the computer, devices within a plurality of devices to form a set of devices based on configuration data corresponding to the devices, device usage data corresponding to the devices and user profile data corresponding to the devices;

adding, by the computer, a set of application changes to a change list;

deploying, by the computer, an application change to a subset of the set of devices in response to determining that the application change is available;

determining, by the computer, whether the change list is empty;

responsive to the computer determining that the change list is empty, increasing, by the computer, a predefined configuration threshold distance level to increase a number of devices included in a the set of devices;

collecting, by the computer, performance data corresponding to the application change from the subset of devices over a predefined time period; and deploying, by the computer, the application change to a remainder of devices in the set of devices in response to the performance data indicating a positive application change to the subset of devices increasing a level of performance of the subset of devices greater than an increased performance threshold level.

17. The computer program product of claim 16 further comprising:

identifying, by the computer, application exceptions not running on a majority of devices in the set of devices based on monitoring applications running on the set of devices; and removing, by the computer, the application exceptions running on one or more of the set of devices.

18. The computer program product of claim 16 further comprising:

receiving, by the computer, an indication that a new device joined a network corresponding to the computer; and retrieving, by the computer, configuration data corresponding to the new device via the network.

19. The computer program product of claim 18 further comprising:

placing, by the computer, the new device in the set of devices that are within a predefined configuration threshold distance level of the new device based on the configuration data corresponding to the new device;

determining, by the computer, whether an application change history exists for the set of devices; and responsive to the computer determining that the application change history does not exist for the set of devices, retrieving, by the computer, the performance data from the set of devices.

* * * * *